United States Patent
Brome et al.

(10) Patent No.: US 6,984,171 B2
(45) Date of Patent: Jan. 10, 2006

(54) HYDRO-MECHANICAL THRESHING ROTOR CONTROL SYSTEM FOR AN AGRICULTURAL COMBINE

(75) Inventors: John G. Brome, Delavan, WI (US); Yun-Ren Ho, Naperville, IL (US); John E. Bundy, Racine, WI (US)

(73) Assignee: CNH America LLC, Racine, WI (US)

( * ) Notice: Subject to any disclaimer, the term of this patent is extended or adjusted under 35 U.S.C. 154(b) by 117 days.

(21) Appl. No.: 10/199,681

(22) Filed: Jul. 19, 2002

(65) Prior Publication Data

US 2004/0014509 A1   Jan. 22, 2004

(51) Int. Cl.
*A01F 7/06* (2006.01)
*F26B 25/22* (2006.01)

(52) U.S. Cl. ....................................................... 460/59
(58) Field of Classification Search ................. 56/14.6, 56/11.7, 11.1, 10.3, 10.2 R, 10.6, 10.8, 11.3, 56/11.4, 11.5; 475/81, 82, 76–9, 1, 257, 475/269, 303, 329; 460/59, 6, 119, 149; 477/68–9, 110

See application file for complete search history.

(56) References Cited

U.S. PATENT DOCUMENTS

| | | | |
|---|---|---|---|
| 3,796,111 A | 3/1974 | Schauer | |
| 3,903,756 A * | 9/1975 | Hamma | 475/76 |
| 4,019,404 A * | 4/1977 | Schauer | 475/82 |
| 4,332,262 A | 6/1982 | De Busscher | |
| 4,522,553 A | 6/1985 | Nelson et al. | |
| 4,694,648 A | 9/1987 | Beck, Jr. | |
| 4,800,711 A | 1/1989 | Hurlburt et al. | |
| 4,846,198 A | 7/1989 | Carnewal et al. | |
| 4,866,920 A | 9/1989 | Kerckhove et al. | |
| 4,907,402 A | 3/1990 | Pakosh | |
| 4,967,544 A | 11/1990 | Ziegler et al. | |
| 5,155,984 A | 10/1992 | Sheehan | |
| 5,667,452 A * | 9/1997 | Coutant | 475/81 |
| 5,865,700 A | 2/1999 | Horsch | |
| 5,873,227 A * | 2/1999 | Arner | 56/14.6 |
| 6,247,295 B1 | 6/2001 | Hansen et al. | |
| 6,726,560 B2 * | 4/2004 | Ho et al. | 460/59 |

FOREIGN PATENT DOCUMENTS

EP    1072817 A2 *    1/2001

* cited by examiner

Primary Examiner—Árpád Fábián Kovács
(74) Attorney, Agent, or Firm—Brant T. Maurer; Rebecca Henkel (57) ABSTRACT

A hydro-mechanical control system for an agricultural combine threshing rotor is operable 1) to transfer torque to the rotor so as to maintain rotor velocity within an acceptable range of a commanded velocity despite small fluctuations in rotor load and engine speed, 2) to reduce wear on mechanical components of the rotor drive system during rotor acceleration, 3) to employ the most efficient combination of mechanical and hydrostatic rotor drive characteristics during steady state operation of the rotor and 4) to reduce the likelihood of engine stall. The system includes a mechanical motor such as an engine, a hydrostatic motor, and a gearset disposed between both motors and the rotor. A clutch is operable to selectively couple the mechanical motor to the gearset, and a brake is selective operable to selectively arrest a driven gear of the gearset from rotation.

11 Claims, 6 Drawing Sheets

HYDRO-MECHANICAL THRESHING ROTOR CONTROL SYSTEM FOR AN AGRICULTURAL COMBINE

BACKGROUND OF THE INVENTION

1. Field of the Invention

The invention relates to agricultural combines and, more particularly, relates to a method and apparatus for selectively controlling a threshing rotor of an agricultural combine by controlling the operation of a hydro-mechanical drive system for the rotor.

2. Discussion of the Related Art

Agricultural combines or "combine harvesters" are well-known for harvesting crops such as corn, soybeans, and wheat. The typical combine includes a self-propelled chassis supported on the ground via driving and driven wheels. A replaceable harvesting head is mounted on the front of the chassis for harvesting the crop of interest. The combine is operable to feed the harvested grain from the head to an internal threshing and separating system that separates the grain from stalks, pods, cobs, etc. (collectively referred to herein as "chaff") and that transfers the grain to an on-board storage hopper. The stored grain can be periodically transferred to a wagon or the like by an auger mounted on the chassis adjacent the storage hopper.

The threshing and separating system of the typical combine includes at least one threshing rotor, a concave, a grain pan, sieves and fans. Of these components, the rotor is of the most importance for purposes of the present invention. (The rotor(s) will hereafter be referred to in the singular for the sake of convenience, it being understood that the problems addressed by the invention, and the invention itself, are equally applicable to single rotor and multiple rotor systems). Torque is typically transferred to the rotor directly from the engine by a belt drive system that is engaged by a mechanical clutch. However, in order to increase the amount of crop processed by the combine, the size, weight and power consumption of the rotor are being increased to levels above the tolerances of belt driven technology. It is difficult to accelerate such a rotor from rest, particularly under certain crop conditions, because accelerating the high-inertia rotor places high stresses on both the belt drive and the clutch used to engage the belt drive. The loads imposed on the rotor after it is accelerated up to speed also can vary dramatically. The stress on the clutch and belt can be severe, resulting in early clutch and belt failure. Additionally, there are instances in which the combine encounters a "slug" condition in which the operator may determine that the crop is lodged between the rotor and concave. It may be desirable in this situation to permit the operator to control the rotor to reverse the direction of rotor rotation to deslug the rotor.

So-called "split-torque" or "hydro-mechanical" transmissions have been proposed to address these and other problems encountered when driving a threshing rotor. For instance, U.S. Pat. No. 5,865,700 to Horsch discloses a hydro-mechanical drive system including an engine and a hydrostatic motor which derives its power from the engine. A single clutch controls the input of the engine power and input of the hydrostatic motor power. However, if input from the hydrostatic motor is not precisely synchronized with input of the engine, the input of the hydrostatic motor could brake the engine, possibly damaging to the engine.

U.S. Pat. No. 6,247,695 to Hansen discloses a combine having a hydro-mechanical transmission that is designed to alleviate the problems exhibited by Horsch and other hydro-mechanical transmissions by accelerating the rotor by gradually engaging the clutch. More specifically, in the system disclosed in the Hansen patent, an engine drives a wet clutch and a hydrostatic motor. The output of the motor drives the sun gear of a hydro-mechanical planetary drive, and the output of the clutch drives the ring gear of the same drive. A carrier of the planetary drives the rotor. The transmission is controlled by a microcomputer that receives signals from an engine speed sensor and a rotor speed sensor. The microcomputer also transmits controlling signals to the hydrostatic pump's swash plate and to a clutch valve to control clutch engagement. The microcomputer can also send a signal to brake the ring gear while reversing the direction of the hydrostatic pump motor to allow it to act as a reverser for the rotor to effect a deslugging operation. The microcomputer also can receive signals from the rotor speed sensor to control a supply valve for the clutch to ensure that the clutch input and output are synchronous.

The hydro-mechanical rotor drive system disclosed in the Hansen patent is only partially effective at addressing the problems encountered by the prior art. For instance, the system relies on gradual engagement of the wet clutch to accelerate the rotor from rest to the commanded speed. That is, hydraulic pressure in the wet clutch is increased progressively as rotor speed increases from rest until the clutch input and output are synchronous.

The ring to frame brake remains disengaged at this time, and torque from the hydraulic motor is supplied only to provide any necessary make up torque between that provided by the engine and that required to place the rotor in its desired instantaneous operating state, i.e., to accelerate the rotor at the desired rate and/or to maintain rotor velocity constant during steady state operation of the machine. This control operation places considerable strain on the wet clutch, shortening the life of the clutch and the belt. In addition, clutch engagement is controlled by switching the flow of hydraulic fluid hence effectively rendering the clutch an ON/OFF clutch that is either essentially fully-engaged or essentially fully-disengaged. In addition, the Hansen patent controls rotor speed strictly in dependence on prevailing engine speed. Hansen considers this control to be advantageous because decreases in motor speed resulting from a slug condition will alert the operator that the machine is overloaded and, theoretically, cause the operator to lower the rotor power in order to allow the engine to recover. However, this technique results in frequent, potentially undesired variations in rotor speed, particularly when engine speed changes occur through factors other than a rotor slug condition.

In addition, rotor speed in Hansen is varied strictly as a function of hydraulic and mechanical motor speeds. Depending on the circumstances, the hydrostatic motor may have to supply substantial positive or negative make-up torque to make up a large difference between commanded rotor velocity and the actual engine velocity. For instance, at a low nominal engine speed and a high commanded rotor velocity, torque transfer may be divided generally equally between the engine and the hydrostatic motor. This "split delivery" is relatively inefficient because a relatively large percentage of power must be supplied by the relatively inefficient hydrostatic motor rather than more efficient mechanical motor. The required make-up torque could be reduced substantially if the speed range of the system's gearing could be altered to assure that an engine operating at a particular speed always drives the rotor at or reasonably near the commanded rotor velocity.

The need therefore has arisen to provide a method of controlling operation of a threshing rotor of an agricultural combine so as to minimize clutch wear.

The need has also arisen to provide a method of improving the torque transfer efficiency of a threshing rotor drive system throughout the operational range of the rotor.

The need has also arisen to provide a method of deslugging a threshing rotor without sacrificing the efficiency of other operational aspects of the system.

The need therefore has arisen to provide a simple, reliable, durable, and efficient hydro-mechanical threshing rotor drive system for an agricultural combine.

SUMMARY OF THE INVENTION

In accordance with a first aspect of the invention, a method of driving a threshing rotor of an agricultural combine includes coupling a hydrostatic motor to the rotor and driving the rotor to accelerate from a prevailing velocity to at least generally a commanded rotational velocity. The motors are preferably selectively coupled to the rotor via a common gearset and can be controlled to accelerate and maintain the rotor at a constant velocity.

In a particularly preferred method, the hydrostatic motor is always coupled to the rotor, and the mechanical motor is uncoupled from the rotor only during the first phase of rotor acceleration from rest. This control technique reduces clutch wear during at least a substantial portion of the rotor acceleration phase. Then, after the mechanical motor is coupled to the rotor, the hydrostatic motor remains coupled to the rotor, and its output is modulated as necessary to maintain the rotor velocity at least substantially at the commanded rotor velocity.

In order to in crease the range of available rotor speeds for a given, relatively narrow mechanical motor speed range, the method may additionally include selecting one of a plurality of a desired rotor speed ranges by operation of a multi-speed gearbox located between the gear-set and the rotor.

The method preferably additionally includes detecting a rotor slug condition in which the rotor is jammed and manually controlling the system to uncouple the mechanical motor from the rotor and to deslug the rotor by controlling operation of the hydrostatic motor so as to free the rotor. The controlling step may comprise alternatively and repeatedly running the hydrostatic motor in forward and reverse directions.

In accordance with another aspect of the invention, a threshing rotor drive system comprises an agricultural threshing rotor, a mechanical motor, a hydrostatic motor, a gearset located between the motors and the rotor, and a control system that controls the gearset so as to at least selectively couple at least one of the motors to the rotor. The control system is dimensioned and configured to couple the hydrostatic motor to the rotor to accelerate the rotor from a prevailing velocity to at least approximately a commanded rotational velocity.

The gearset preferably includes a sun gear coupled to the hydrostatic motor, a plurality of planet gears coupled to the rotor, and a ring gear operatively coupled to the planet gears. A clutch is responsive to the controller to selectively couple the mechanical motor to the ring gear, and a brake is responsive to the controller to selectively arrest the ring gear from rotation.

The mechanical motor preferably (but not necessarily) comprises an engine of a harvesting machine incorporating the rotor, and the hydrostatic motor preferably is driven by a variable output pump which is driven by the engine.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. System Overview

Figure 1:
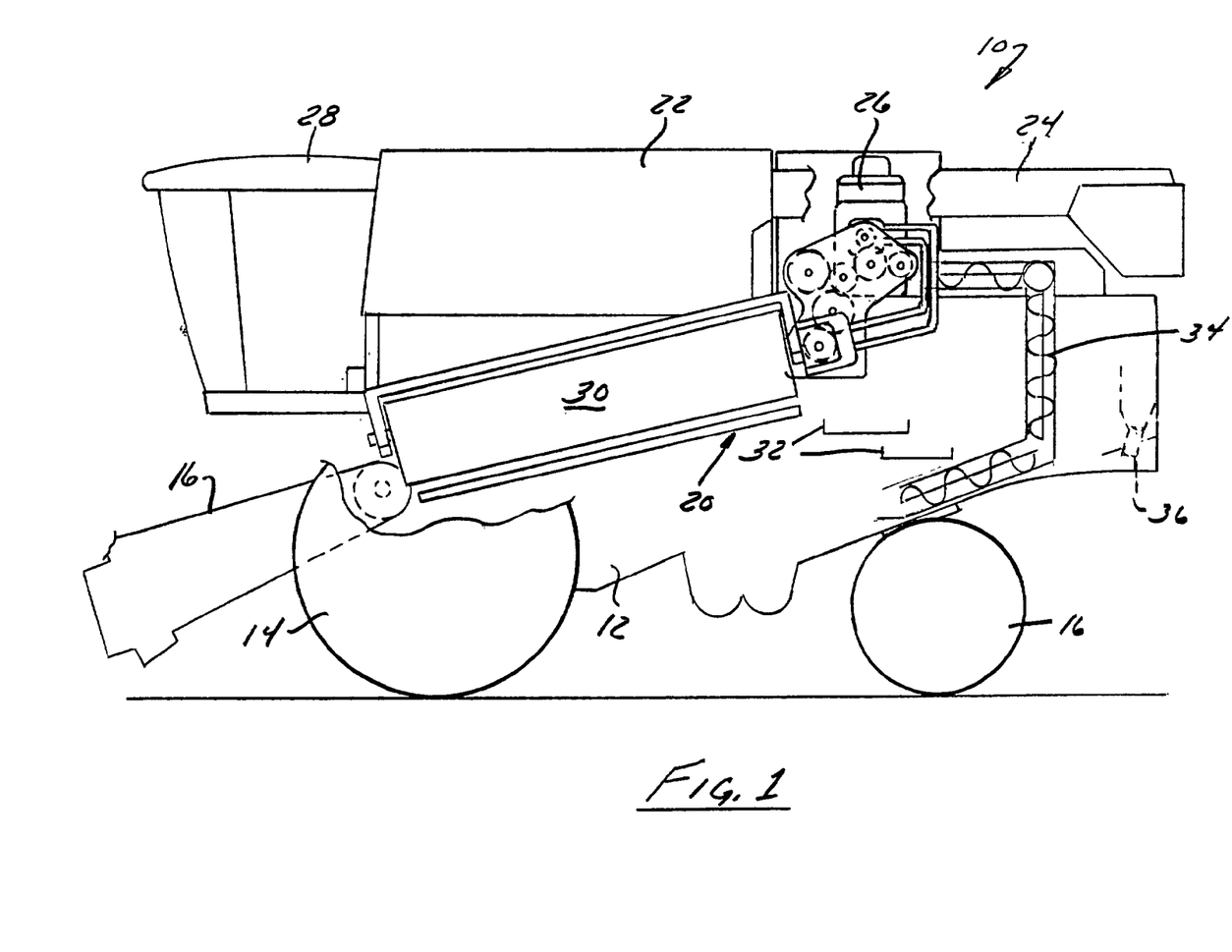
FIG. 1 schematically illustrates an agricultural combine incorporating a hydro-mechanical threshing rotor control system constructed in accordance with a preferred embodiment of the invention.

Referring now to the drawings and initially to FIG. 1 in particular, an agricultural combine 10 is illustrated that incorporates a hydro-mechanical threshing rotor drive system constructed in accordance with a preferred embodiment of the invention. Except for the threshing rotor drive system, the combine 10 is at least essentially conventional. It includes a self-propelled chassis 12 supported on the ground via a pair of relatively large front driving wheels 14 and a pair of relatively small rear steering wheels 16. A replaceable harvesting header 18 is mounted on the front of the feeder 17 for harvesting the crop of interest. The harvesting head 18 may be a so-called "grain head" configured to harvest soybeans, wheat, oats, or the like. In most combines, the grain head can be replaced with another harvesting head such as a so-called "corn head" configured to detach ears of corn from stalks. The combine 10 is operable to feed the harvested grain from the header 18 to an internal threshing and separating system 20 that separates the grain from stalks, pods, cobs, etc. (collectively referred to herein as "chaff".) A storage hopper 22 stores the harvested grain. An auger 24, mounted on top of the combine 10, conveys the harvested grain to a wagon, another auger, or another storage and/or transfer device or facility. The combine 10 is powered by an internal combustion engine 26 mounted on the chassis 12 behind the hopper 22. All of these operations are controlled by an operator stationed in a cab 28 located at the front of the chassis 12.

Still referring to FIG. 1, the threshing and separating system 20 includes a threshing rotor 30 that beats the harvested crop to remove the grain from the chaff, grain pans 32 that receive the separated grain, an auger 34 that transfers the grain to the hopper 22, and a chaff spreader 36 that discharges the chaff to the rear of the machine 10. Torque is transferred to all powered components of system 20 from the engine 26, either directly, or indirectly via a pump powered by the engine via a hydrostatic motor as detailed below.

2. Rotor Control System

Pursuant to the invention, the rotor 30 is driven by a hydro-mechanical rotor control system 40 (FIG. 2) that is operable 1) to transfer torque to the rotor so as to maintain rotor velocity within an acceptable range of a commanded velocity despite fluctuations in engine speed or rotor load, 2) to reduce component wear on mechanical components of the rotor drive system during rotor acceleration, 3) to employ the most efficient combination of mechanical and hydrostatic rotor drive characteristics during steady state operation of the rotor and 4) to reduce the likelihood of engine stall.

Figure 2:
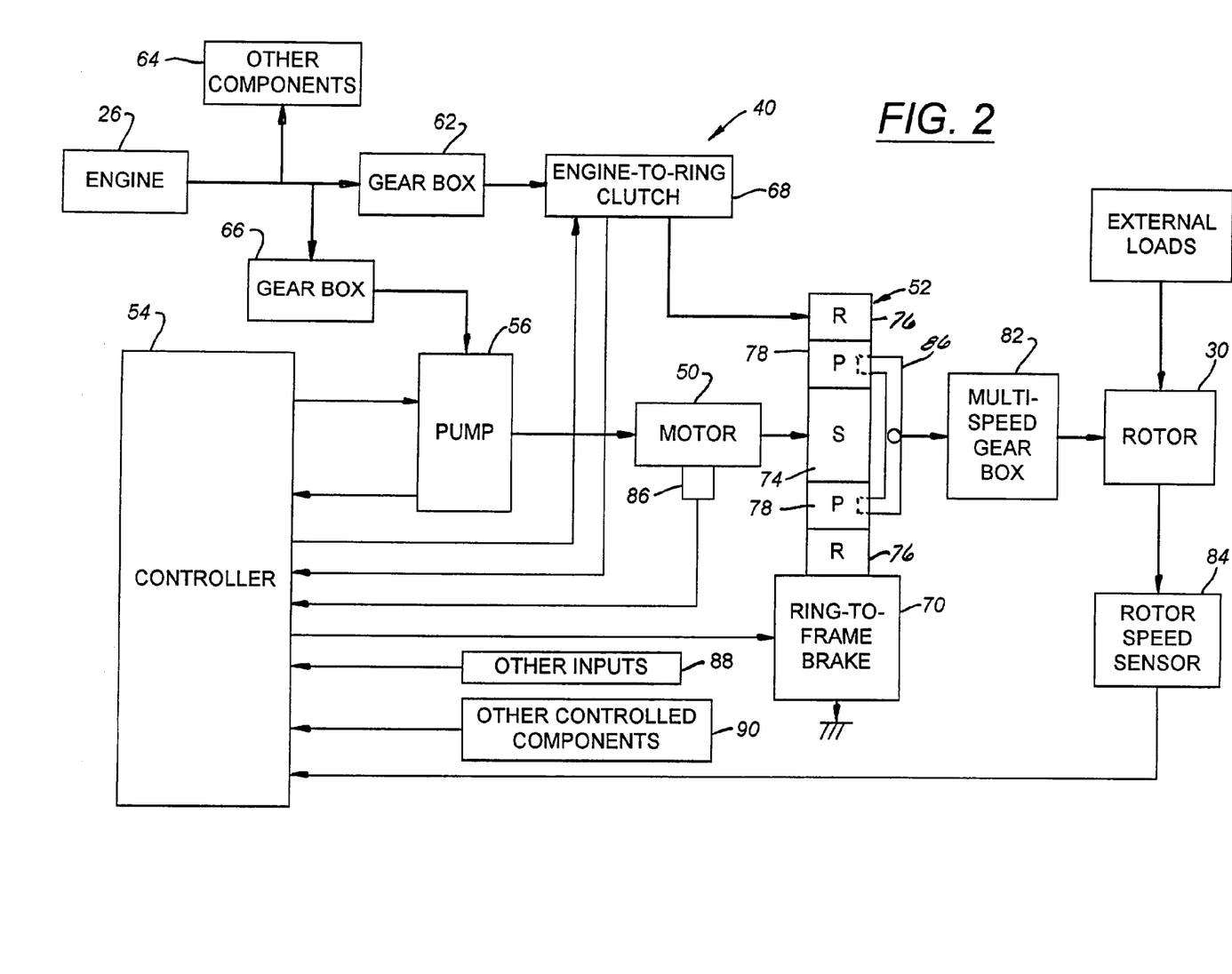
FIG. 2 schematically illustrates the hydro-mechanical rotor control system of the combine of FIG. 1.

Referring to FIG. 2, the system 40 of the illustrated embodiment includes a mechanical motor, a hydrostatic motor 50, a gearset 52, and a controller 54 that controls the gearset 52 so as to selectively couple at least one of the motors to the rotor 30. The mechanical motor comprises the combine's engine 26, but it is conceivable that the motor could comprise an electrical motor or other motor that is driven by the engine 26. The hydrostatic motor 50 is driven by a pump 56. The pump 56 preferably is variable output pump that can be driven by the engine 26 to supply a selectively variable hydraulic flow to the motor 50. For instance, the pump 56 may have a swash plate that is movable by energizing a coil of a control valve such that pump output varies with the magnitude of current supplied to the valve coil. The motor 50 is driven by the pump 56 to supply torque to the gearset 52.

Still referring to FIG. 2, the engine 26 has an output that is coupled to a first gearbox 62 and to other driven components of the combine 10 (collectively denoted 64). It is also coupled to a second gearbox 66 coupled to the pump 56. The first gearbox 62 is selectively coupled to the gearset 52 via a clutch 68. The clutch 68 may comprise a wet clutch of the type disclosed in the Hansen patent or any other clutch capable of selectively coupling the gearbox 62 to the gearset 52. The gearbox 62 and wet clutch 68 therefore form a mechanical torque path selectively coupling the engine 26 to the gearset.

The mechanical torque path can be effectively disabled by engaging a ring-to-frame brake 70 and disengaging the clutch 68 acting on the gearset 52. The brake 70 may comprise any latching or braking mechanism capable of arresting an associated gear of the gearset 52 from rotation upon demand. For instance, it may comprise a brake that is actuated by a piston-cylinder arrangement upon actuation of a valve under control of the controller 54.

The gearset 52 could comprise any of a number of structures that selectively couple the gearbox 62 and/or the hydraulic motor 50 to the downstream components of the system 40 depending on the operational states of the clutch 68 and the brake 70. In the illustrated embodiment, the gearset 52 comprises a sun gear 74, a ring gear 76 surrounding the sun gear 74, and a plurality of planet gears 78. The planet gears 78 are disposed between and mesh with the sun gear 74 and the ring gear 76. The planet gears 78 are mounted on a common carrier 86 that is coupled to the remainder of the system 40 so that torque is transmitted to the rotor 30 via the carrier.

The ring gear 76 is coupled to the clutch 68 and the brake 70 so as to be rotatable under the power of the engine 26 and gearbox 62 upon clutch engagement or arrested from rotation upon brake engagement. Torque therefore can be transmitted to the carrier 86 either solely from the hydrostatic motor 50 or via a combination of the engine 26 and the hydrostatic motor 50. Specifically, when the clutch 68 is released and the brake 70 is engaged, the engine 26 is uncoupled from the ring gear 76, and torque is transferred to the carrier 86 via the hydrostatic pump 56 and motor 50. Conversely, if the clutch 68 is engaged and the brake 70 is released, torque can be transferred to the carrier 86 from the engine 26 via the clutch 68, the pump 56 and the hydrostatic motor 50. These controls are discussed in greater detail below.

Still referring to FIG. 2, the rotor 30 is coupled to the carrier 86 by a multi-speed gearbox 82. The multi-speed gearbox 82 has a speed-change ratio that can be selectively varied so that multiple rotor speeds are available for any one gearbox input speed. The operator can select the desired speed-change ratio via manipulation of suitable control(s) located within the cab or, more likely, at a location adjacent the gearbox 82. As a result of this selection, multiple output speed ranges are available for a given, relatively narrow input speed range, permitting the system to always operate as close as practical to maximum efficiency over a much greater range of rotor speed than would otherwise be possible. For instance, typically one of four (neutral, low, medium and high) gear ranges can be selected, permitting rotor speed to be varied from about 270 rpm in the reverse direction to about 1200 rpm in the forward direction.

The controller 54 may comprise any on-board computer or computers capable of controlling operation of the pump 56, the clutch 68, and the brake 70. It preferably is also configured to control other computer-controlled components of the combine 10. In the illustrated embodiment, the controller 54 comprises an electronic control unit (ECU) with an input/output device that relays signals to and from the operator via manual controls and/or another controller. For example, an operator can read rotor speed, and current rotor gear range from a touch-screen display unit. He/she can also input a command rotor speed to the display. After the speed is entered, the display will send the value to the rotor controller via a CAN bus. Another example is that the operator can also alter the rotor command speed by pressing either an increment button or a decrement button on the control console. The console controller receives the command from the buttons and informs the rotor controller of the speed change via CAN bus.

The controller 54 has inputs coupled to a rotor speed sensor 84, a hydraulic motor speed sensor 87, and possibly other inputs collectively denoted 88. Sensor 87 may measure motor speed either directly or, more preferably, by monitoring rotation of one of the gears of the motor 50. The controller 54 also receives feedback signals from the pump valve coil, the clutch 68, and possibly the brake 70. Its outputs are connected to the control coil for the pump control valve, the clutch 68, the brake 70, and possibly other controlled components collectively denoted 90. The signals from the rotor speed sensor 84 and the motor speed sensor 87 serve as primary inputs for the control of the rotor drive system. The current feedback signal from the clutch coil provides redundancy or serves as a fallback signal in the absence or intermittent presence of data from the rotor speed sensor 84. Similarly, the current feedback signal from the pump valve coil provides redundancy or serves as a fallback signal in the absence or intermittent presence of data from the hydrostatic motor speed sensor. The pump control valve coil current is used to control pump operation during acceleration as detailed below.

As mentioned briefly above, the controller 54 is operable to control operation of the pump 56, the clutch 68, and the brake 70 to initially accelerate the rotor 30 using only the hydrostatic motor 50 and to thereafter deliver torque to the rotor 30 at least primarily from the engine 26, supplying additional make-up (or detractive) torque to or from the gearset 52 from the hydrostatic motor 50 only as may be required to reduce or negate the effects of fluctuations in engine speed and/or fluctuations in rotor load on rotor speed.

Figure 3:
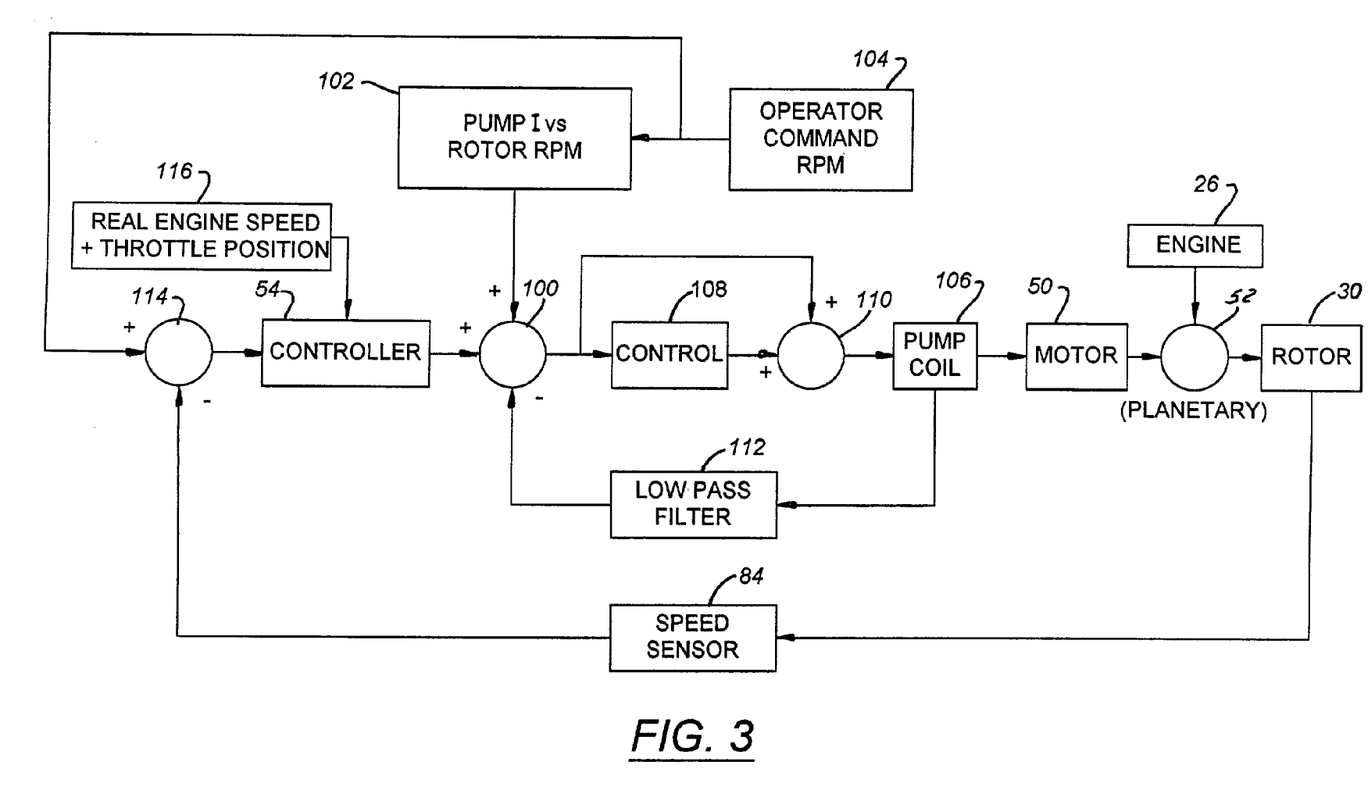
FIG. 3 schematically illustrates a procedure for supplying drive current to a pump control valve coil of the hydro-mechanical drive system of FIG. 2.
Figure 4:
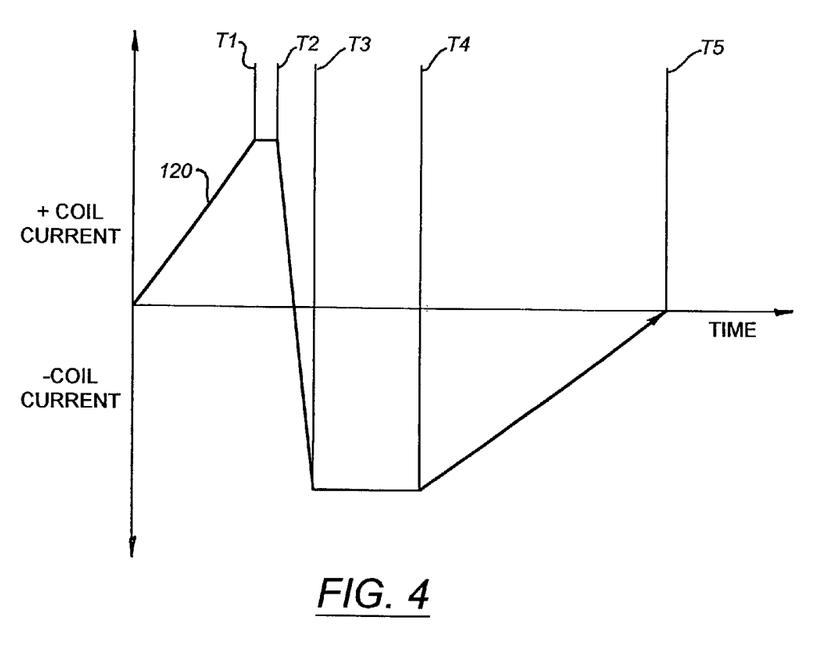
FIG. 4 is a timing diagram illustrating changes in hydrostatic pump control valve coil current during threshing rotor acceleration.
Figure 5:
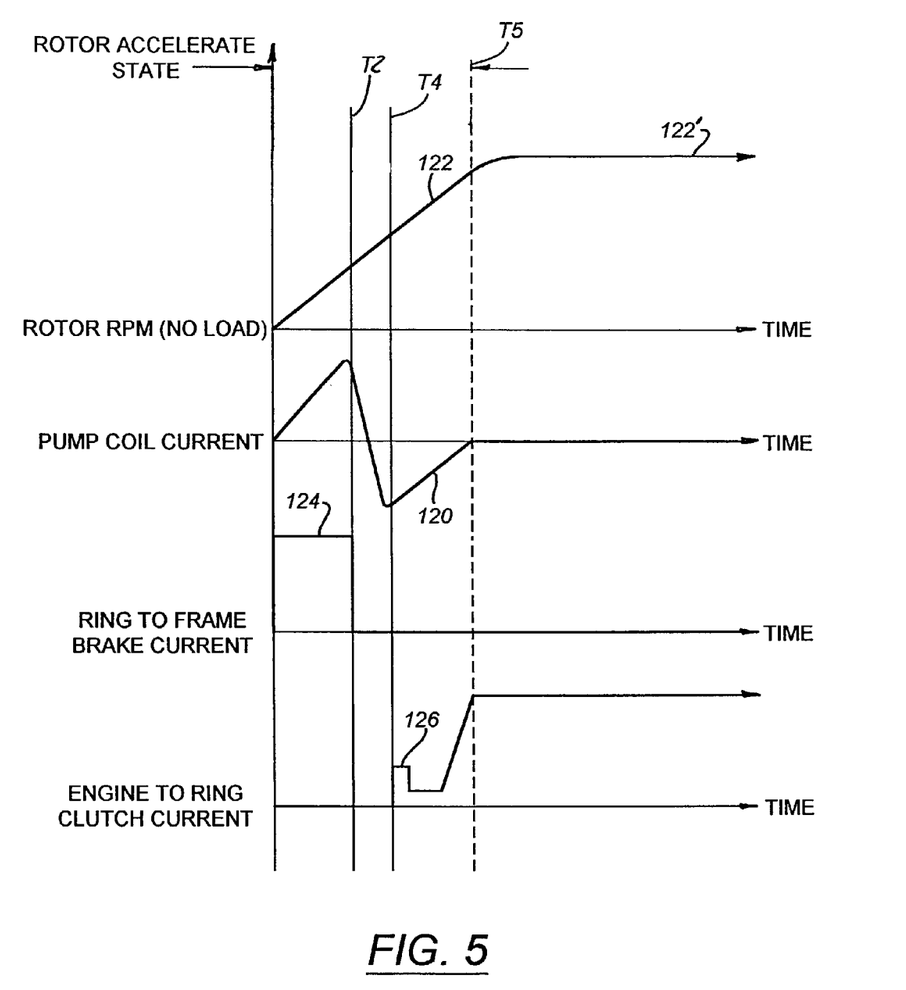
FIG. 5 is a timing diagram illustrating pump control valve coil current, ring to frame brake current, engine to ring clutch current, and rotor run state during rotor acceleration and subsequent steady state rotor operation.

Rotor acceleration from rest is controlled using the control scheme of FIG. 3 and the process illustrated in FIGS. 4, and 5. Specifically, referring to the center portion of FIG. 3, a first summing junction 110 receives a signal indicative of a commanded current which is generated by a pre-determined pump valve coil current vs. time look up table 105. The signal is then compared to a feedback signal from a low pass filter 112 to generate an error signal. Based on the error signal, a current feedback control algorithm 108 produces a modulated voltage to drive the pump valve coil 106. The pre-determined pump valve coil current vs. time look up table is illustrated graphically in FIG. 4 from the starting point to time T4. Specifically, referring to the curve 120 of FIG. 4, pump valve coil current is increased rapidly from the starting point and held steady from time T1 to time T2 to accelerate the rotor 30 hydro-statically. By time T2, the rotor 30 has accelerated to a conditional threshold, e.g. the maximum hydro-static speed of the rotor (or the maximum speed of the motor) at the current engine speed in one of the four speed ranges, at which the more efficient mechanical path starts to engage the rotor via the clutch 68. Between time T2 and time T3, the pump displacement is commanded from the maximum positive displacement to the maximum negative displacement, then, held steady until time T4. At this instant, the "acceleration" state ends and the "run" state starts.

Control of the remaining components of the rotor control system in both the acceleration and run modes is illustrated in FIG. 5, including the no load rotor speed 122', the pump valve coil current 120, the ring to frame brake current 124, and the engine to ring clutch current 126. The curve 120 in FIG. 5 is a re-production from FIG. 4. Curve 124 in FIG. 5 illustrates that the ring to frame brake 70 is engaged during the hydrostatic acceleration phase until the time T1. Because of the dynamics of the ring to frame brake 70, it is disengaged after time T1 to guarantee the disengagement between the ring 76 and frame before time T2. After time T2, the controller 54 starts to progressively apply a commanded current, represented by the curve 126, to the engine to ring clutch coil. It uses the same feedback algorithm as the pump valve coil current control. This is done to reduce the error between the command and the actual current. The engine to ring clutch engagement curve is developed as follows; 1) an initial boost current is provided to shorten the fill-in time for the clutch cavity; 2) to accelerate the rotor, torque is transmitted while slipping the clutch around time T3, and ramping current until both sides are synchronized by time T4, which is the end of the acceleration state and the beginning of the run state. At this instant, the rotor 30 has been accelerated to the minimum command speed, i.e. minimum hydro-mechanical speed, in the speed range. Then, the clutch current ramps up fast to fully engage the clutch. At the same time, the pump valve coil current is controlled to ramp to the commanded pump current. By time T5, the rotor 30 is accelerated to its commanded velocity and thereafter retained at or near the commanded velocity as represented by the portion 122' of the curve 122. From the rotor acceleration procedure mentioned in the previous two paragraphs, it can be seen that the engine to ring clutch 68 is used to accelerate the rotor speed only from a conditional threshold (i.e. the maximum hydrostatic speed) to the minimum hydro-mechanical speed in the speed range. Hence, the procedure greatly reduces wear and extends the life of the clutch 68.

As discussed above, the pump 56 is controlled during the run-mode of the rotor 30 to maintain the commanded speed within tolerance and within reasonable fluctuations in engine speed and/or fluctuations in rotor load. This control is illustrated graphically in FIG. 6, which illustrates rotor speed during steady state operation of the rotor drive system. The curve 122 illustrates the nominal rotor speed, and the curves 130 and 132 illustrate the end points of a speed range or error tolerance maintained by supplying make-up torque to the rotor 30 from the hydrostatic motor 50. The sloped portions of the curves 122, 130, and 132 illustrate that the commanded rotor speed is obtainable only if the engine 26 has accelerated to at least high idle (typically about 2150 rpm) prior to rotor engagement Otherwise, only fixed commanded current is sent to the pump valve coil to maintain a fixed ratio between engine speed and rotor speed.

Figure 6:
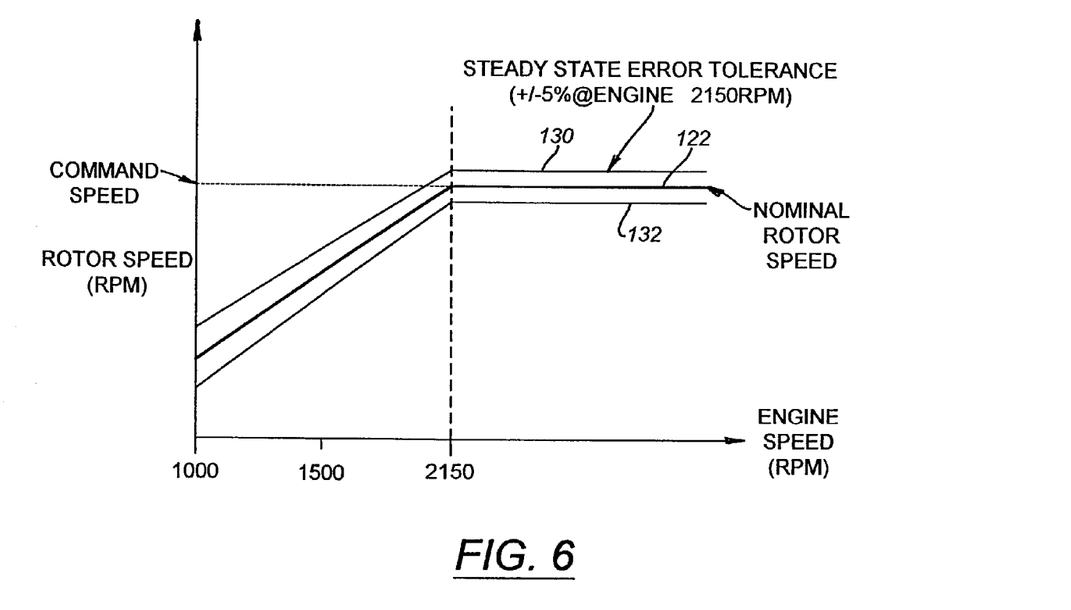
FIG. 6 is a graph of rotor velocity versus engine velocity for typical operation of the hydro-mechanical rotor drive system.

Assuming that the engine 26 is running at a velocity above high idle, the pump 56 is controlled to achieve the effects of FIG. 6 using the control scheme illustrated in FIG. 3. Specifically, in addition to employing the summing junction and algorithms discussed above during the acceleration mode, the controller 54 also applies an additional input to the summing junction 100 based on a signal received from another summing junction 114. The summing junction 114 combines signals received from the rotor speed sensor 84 and the rotor speed command 104 and outputs a signal indicative of the difference between those two signals. The controller 54 receives the signal from the summing junction 14, as well as signals indicative of the real engine speed and throttle position (see box 116), and forwards a control signal to the summing junction 100. The control signal from controller 54 is additionally combined with a signal indicative of the relationship between pump valve coil drive current, command rotor speed 102 and the pump current feedback signal 112 as described above to modulate hydrostatic motor torque as may be required to add to or detract from the torque supplied by the engine 26.

Rotor deceleration upon system shutdown is controlled in a much simpler manner. Preferably, the clutch 68 and brake 70 are both disengaged, and energizing current to the pump valve coil is cut off. Rotor speed thereafter decays exponentially until rotor rotation ceases.

The rotor drive control system 40 is also preferably configured to perform operations in addition to normal rotor acceleration and speed control. For instance, it preferably is capable of permitting the operator to operate the system 40 to drive the rotor 30 to perform a deslug operation occurring when the rotor 30 becomes jammed with debris. Specifically, upon detecting a slug condition, typically by noting that the rotor 30 has stopped rotating or is rotating at an unacceptably slow speed, the operator manipulates a switch in the cab 28 to cause the controller 54 to disengage the clutch 68 and engage the brake 70 to uncouple the engine 26 from the rotor 30. The operator may thereafter operate the controller 54 to the pump 56 to "rock" the rotor 30 back and forth at a relatively low speed of, e.g, 10–50 rpm. The deslugging process will typically involve periodically applying forward and reverse energizing current to the pump valve coil. This current may be supplied asymmetrically in magnitude and/or time such that the rotor 30 is driven faster and/or through a greater range of movement in one direction than the other during the deslugging operation. Then, after deslugging is complete, the rotor 30 is once again accelerated to the commanded speed and controlled to operate at or near the commanded speed using the procedures described above.

Many changes and modifications could be made to the invention without departing from the spirit thereof. The scope of these changes will become apparent from the appended claims.

We claim:

1. A method of driving a threshing rotor of an agricultural combine, comprising:
    coupling a hydrostatic motor by a single power path to said rotor and driving said rotor to accelerate from rest to at least generally a commanded rotational velocity; and
    coupling a mechanical motor to said rotor when a maximum speed of the hydrostatic motor is reached and after rotor acceleration has begun and before the rotor has reached the commanded rotational velocity.

2. The method as recited in claim 1, wherein said motors are selectively coupled to said rotor via a common gearset, and further comprising controlling operation of said gearset to selectively couple at least one of said mechanical motor and said hydrostatic motor to said rotor via a gearbox.

3. The method as recited in claim 2, wherein during acceleration of said rotor from rest, the step (A) comprises coupling only said hydrostatic motor to said rotor while leaving said mechanical motor uncoupled from said rotor, and the step (B) comprises initiating coupling of said mechanical motor to said rotor after acceleration of the rotor from rest has begun and when a conditional threshold is reached and then modulating operation of said hydrostatic motor to maintain the rotor velocity at least substantially at the commanded rotor velocity.

4. The method as recited in claim 3, further comprising selecting one of a plurality of desired rotor speed ranges by operation of a multi-speed gearbox located between said gearset and said rotor, and wherein said commanded rotor velocity varies with the selected rotor speed range.

5. The method as recited in claim 2, further comprising modulating operation of said hydrostatic motor by automatically changing displacement of a hydraulic pump drivingly coupled to the motor in response to detected changes in rotor velocity when said hydrostatic motor and said mechanical motor are both coupled to said rotor.

6. The method as recited in claim 5, wherein the modulating step comprises automatically increasing an output speed of said hydrostatic motor at least generally proportionally with a difference between an actual rotor velocity and the commanded rotor velocity.

7. A method of driving a threshing rotor of an agricultural combine, comprising:
    coupling a hydrostatic motor to said rotor and driving said rotor to accelerate from rest to at least generally a commanded rotational velocity; and
    coupling a mechanical motor to said rotor when a maximum speed of the hydrostatic motor is reached and after rotor acceleration has begun and before the rotor has reached the commanded rotational velocity,
    wherein said motors are selectively coupled to said rotor via a common gearset, and further comprising controlling operation of said gearset to selectively couple at least one of said mechanical motor and said hydrostatic motor to said rotor via a gearbox,
    wherein the step of controlling operation of said gearset comprises releasing a ring-to-frame brake and engaging a mechanical motor-to-ring clutch to couple said mechanical motor to said rotor.

8. The method as recited in claim 7, wherein the step of controlling operation of said gearset comprises releasing said clutch and engaging said brake during initial acceleration of said rotor from rest and releasing said brake and engaging said clutch during steady state operation of said rotor.

9. The method as recited in claim 2, further comprising uncoupling said mechanical motor from said rotor, and deslugging said rotor by controlling operation of said hydrostatic motor so as to unjam said rotor.

10. The method as recited in claim 9, wherein the controlling step comprises manually operating said controller to alternatively and repeatedly run said hydrostatic motor in forward and reverse directions and displaying rotor velocity during deslugging.

11. A method of accelerating a threshing rotor of an agricultural combine from rest, comprising:
    (A) coupling a hydrostatic motor to said rotor by a single power path and driving said rotor by automatically and progressively increasing the displacement of a hydraulic pump to accelerate said rotor while leaving a mechanical motor uncoupled from said rotor; and
    (B) when said rotor at least approaches a commanded velocity, automatically coupling the mechanical motor to said rotor while leaving said hydrostatic motor coupled to said rotor.

* * * * *